Figure 3:
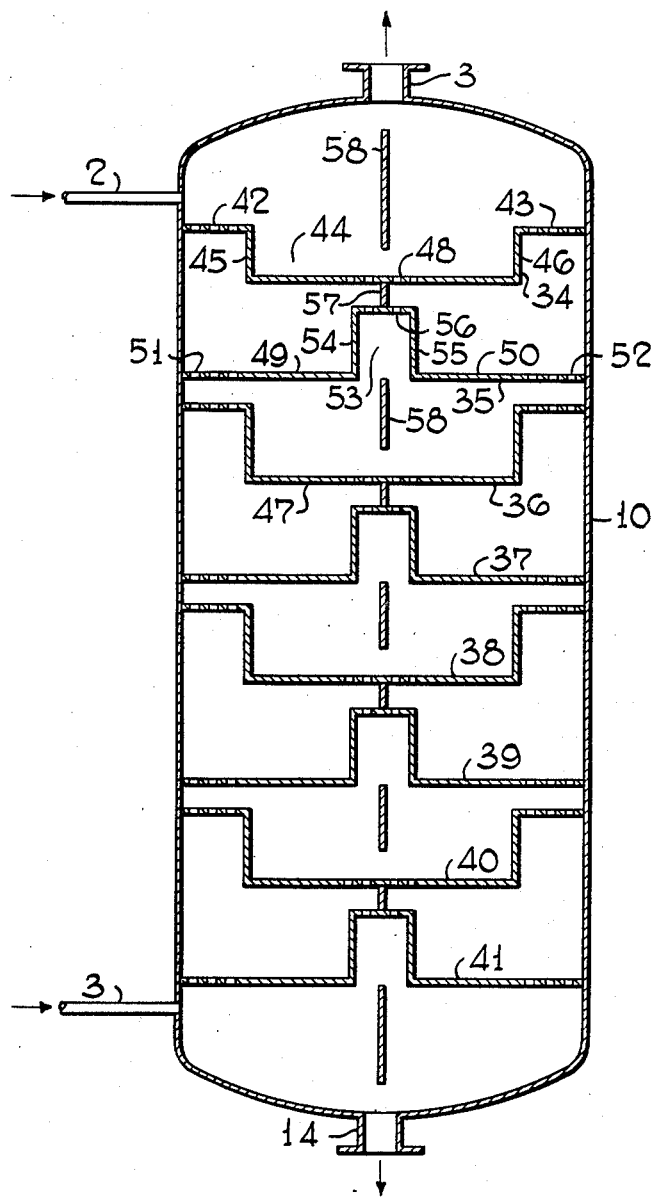

July 14, 1953 R. S. WOOD 2,645,565
LIQUID-LIQUID EXTRACTION TOWER
Filed April 22, 1950 2 Sheets-Sheet 1
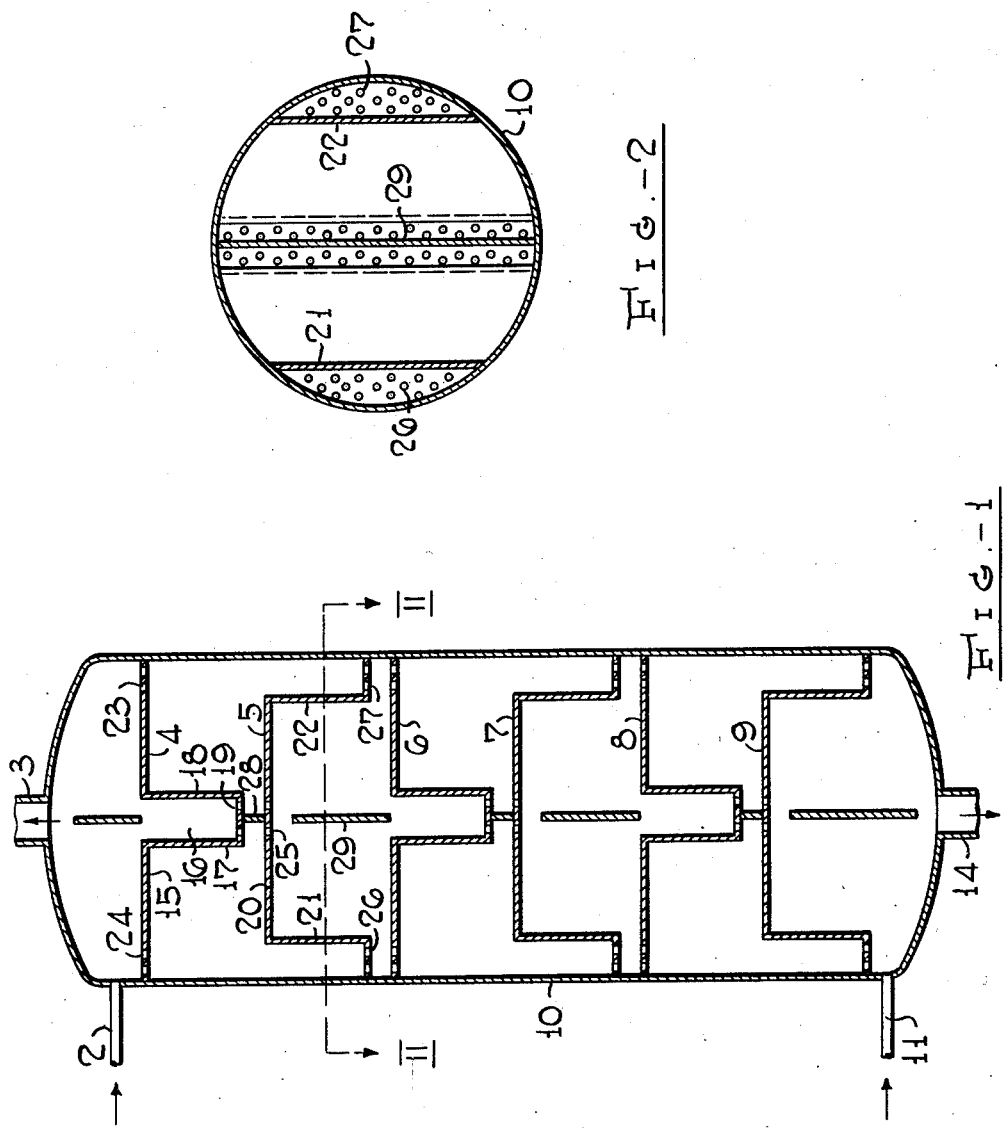
Robert S. Wood Inventor
By W. O. T. Heilman Attorney July 14, 1953 R. S. WOOD 2,645,565
LIQUID-LIQUID EXTRACTION TOWER
Filed April 22, 1950 2 Sheets-Sheet 2

Robert S. Wood Inventor
By W. O. J Heilman Attorney

Patented July 14, 1953

2,645,565

UNITED STATES PATENT OFFICE 2,645,565

LIQUID-LIQUID EXTRACTION TOWER

Robert S. Wood, Elizabeth, N. J., assignor to Standard Oil Development Company, a corporation of Delaware Application April 22, 1950, Serial No. 157,426

5 Claims. (Cl. 23—270.5)

The present invention relates to an improved process and apparatus for the contacting of two normally immiscible, or partly miscible liquids. The invention is adapted for the contacting of liquids in any liquid-liquid system. In accordance with the present invention a novel plate construction is employed in a vertical tower characterized by providing countercurrent mixing and concurrent settling in each pair of plates throughout the tower.

The invention is directed broadly to processes in which liquids are treated by selective solvent action. At the present time there are a great many chemical processes in which a selective solvent is used to treat a particular liquid in order to secure a partial segregation, or removal of chemical constituents of the liquid. For example, petroleum oils are conventionally treated with solvents such as liquid sulfur dioxide, phenol, creosote, nitrobenzene, furfural, aniline, ether and other solvents or mixture of such solvents. Use of these solvents with petroleum oils is particularly employed to remove low viscosity index constituents of the oil to obtain a treated oil having an improved viscosity index. More generally, such solvent treating processes are employed to selectively remove undesired constituents from the liquid being treated with the solvent or in some cases to recover desired constituents.

In solvent treating operations of the general character above described, many modifications are used to control the solvent extraction process as desired, for example, auxiliary solvents, or modifying agents may be injected into the treating system. Again a wide range of temperature and pressure conditions may be employed in particular types of solvent extractions. The present invention is not concerned with the modifications or refinements of solvent treating processes. However, the invention is concerned with the basic method and apparatus used for contacting liquids whatever the particular system may be. It is, therefore, to be understood that this invention is of application to any liquid-liquid contacting system with any of the modifications which may be employed in such processes.

Many methods have been devised for the contacting of liquids. However, it has been found more advantageous to effect large volume interfluid treating in contacting towers rather than in mixers and settlers, centrifuges, etc. Processing in towers is more advantageous from the economic viewpoint because of the lower initial and operating costs. Consequently, considerable attention has been given to the apparatus required for efficient liquid-liquid contacting in towers. The towers which have been employed have been of a wide variety of types some employing various types of packing materials, others employing bubble cap plates and others employing a wide variety of internal baffles. However, of the various types of fluid contacting towers developed, those involving the use of pierced plates have proved to be particularly advantageous in the processing of large quantities of liquids.

Conventional pierced plate towers consist of a large number of horizontally disposed perforated plates extending throughout the tower. The plate perforations provide orifices through which at least one of the liquids may be dispersed. Heretofore, the pierced plates known to the art have been characterized by plate efficiencies not substantially greater than about 50%. By plate efficiency as that term is used, it is meant that each plate is effective in accomplishing a percentage contacting efficiency of the contact achieved at equilibrium in a single batch stage mixer and settler. Thus one theoretical stage is established by contacting two liquids intimately in a batch mixer followed by a thorough settling in a batch settler. As stated, therefore, conventional pierced plate liquid contacting towers, due to their plate efficiency of about 50% substantially require a number of plates exceeding by a factor of two the number of theoretical stages of contacting required. It is clearly of the greatest importance to improve the plate efficiency of the types of pierced plates used in such towers in order to decrease the expense of the contacting and to decrease the size of the towers necessary. It is, therefore, one object of this invention to provide an improved type of pierced plate extraction tower in which the plate efficiencies are substantially above 50%.

In analyzing the necessary mechanism required in liquid-liquid contacting it is apparent that two basic effects are required. These are efficient mixing of the liquids followed by efficient separation of the mixed liquids. Thus in extraction towers having a given number of plates for best efficiency it is necessary that each plate, or set of plates provide good mixing and provide good settling. Only by achieving both of these desiderata in such a tower is it possible to secure many theoretical stages. Conversely considering any one extraction plate, such a plate can only have a high plate efficiency if the plate is capable of both thoroughly mixing and thoroughly separating the mixed liquids. It is, therefore, a further and more particular object of this invention to provide a type of plate which will most effectively be capable of thoroughly mixing and thoroughly settling liquid phases passing through the plate.

In developing a particular plate design for contacting a given liquid-liquid system, it is necessary to secure certain basic data as to the mixing and settling characteristics of the liquids concerned. For example, certain liquids may be very readily mixed, but when mixed are difficult to separate. Alternatively, other types of liquids are difficult to mix but may be readily separated. As a result of this factor extraction towers known to the prior art have been of different types depending upon the particular liquid-liquid system to be contacted. One of the objects of this invention is to provide an extraction tower which may be readily designed for any liquid-liquid system to provide the necessary mixing and settling to meet the particular characteristics of the liquids to be treated. The extraction tower of the present invention is particularly adapted to the contacting of two liquids which are difficult to mix but easy to separate such as caustic solutions and oil but is also applicable to the contacting of two liquids which are easy to mix but hard to separate, such as phenol and oil.

In copending application Serial No. 51,048, filed September 9, 1948, in the name of John R. Casler and Channing C. Nelson, there is described and claimed a countercurrent contacting tower having a plurality of contacting zones disposed one above the other in which each zone comprises a multi-step perforated lower plate and a multi-step perforated upper plate, the steps being connected by vertical elements and the plates being so disposed that the lowest step of the lower plate is vertically below the highest step of the upper plate. Thus, there is provided a confined countercurrent mixing zone between pairs of plates and an enlarged concurrent settling zone adjacent the mixing zone.

The results from this type of contacting tower have been found excellent when employing medium and low throughputs, but under some conditions at high throughput velocities the velocity of the liquid across the plate sometimes reaches a point at which remixing between the extract and raffinate phases occurs to such an extent that it is not possible to settle out the phases. For any two systems there is a critical plate viscosity beyond which settling is not possible no matter how great the settling time. This is true even for those liquids which are difficult to mix but easy to separate.

It is, therefore, another object of this invention to provide an improved type of pierced plate extraction tower wherein remixing does not occur and easy separation of the phases is accomplished.

In accordance with these objectives of the present invention, a novel plate design has been developed which provides an intimate countercurrent mixing of the liquids to be contacted in a confined portion of the plate, and which provides two enlarged sections of the plate through which split streams of the mixed liquids may flow at a rate below the critical to attain efficient separation of the mixed liquids prior to re-mixing on subsequent plates. The mixing and settling zones provided on these plates may be altered by the particular design of the plate to secure the required amount of mixing and settling for any liquid-liquid system.

The nature of this invention may be fully understood from a consideration of the accompanying drawings as referred to in the following description. In these drawings, Fig. 1 illustrates a complete extraction tower embodying the novel plates of this invention, in which the mixing occurs at the bottom of the plate; Fig. 2 illustrates a cross sectional view of the tower through line 2—2 of Fig. 1; and Fig. 3 illustrates another embodiment of the invention in which the mixing occurs at the top of the plate.

Referring to Fig. 1, particularly as clarified by reference to Fig. 2, it is assumed that a liquid such as petroleum oil is to be treated with an agent such as caustic. The caustic may be introduced into the top of the extraction tower 10 by means of line 2 while the oil to be treated may be introduced at the bottom of the tower by means of line 11. The oil which has been treated will then be removed from the top of the tower through line 3, while the spent caustic will be removed from the bottom of the tower through line 14. Horizontally disposed throughout the vertical length of the tower are a plurality of pierced plates indicated by the numerals 4, 5, 6, 7, 8, 9, etc.

The even-numbered plates are identical as are the odd-numbered plates, but the even-numbered plates are different from the odd-numbered plates. The even-numbered plates, i. e. plates 4, 6, 8, etc., are composed of a horizontal portion 15 surrounding a central trough-like mixing section 16, extending downward from the horizontal portion 15 of the plate. The trough 16 is defined by vertical walls 17 and 18 and a bottom perforated portion 19.

The odd-numbered plates, i. e. plates 5, 7, 9, etc., are composed of a middle flat section 20 and peripheral stepdown portions 21 and 22. The horizontal portion of the even-numbered plates is provided with peripheral perforations 23 and 24 while the horizontal portion of the odd-numbered plates is provided with centrally disposed perforations 25, below the perforated bottom of the trough 16. The step-down portions of the odd-numbered plates are also provided with perforations 26 and 27. A solid baffle 28 extends from the center of perforated section 25 of the immediately below odd-numbered plate. A baffle 29 also extends downwardly from a point somewhat below the center of the perforated section 25 of the odd-numbered plates to a point in the center of the trough opening and in the same plane as the horizontal portion of the next even-numbered plate below. It will be observed that the perforated portion at the bottom of the trough 16 of the even-numbered plates is closely adjacent the perforated section of the horizontal portion of the odd-numbered plates and that the perforated sections of the step-down portions of the odd-numbered plates are closely adjacent the peripherally perforated portions of the horizontal section of the even-numbered plates. By this means a comparatively small confined zone is provided between successive plates. By means of baffles 28 and step-down portions 21 and 22 each plate is provided with two of such confined zones. Also by virtue of baffles 29 and step-down portions 21 and 22 two comparatively large zones are provided adjacent the confined zones on each plate. As will be seen this construction provides two confined centrally disposed mixing zones and two peripherally disposed settling zones on each odd-numbered plate and two centrally disposed settling zones and two peripherally disposed mixing zones on each even-numbered plate.

In considering the manner in which the apparatus illustrated in the drawings operates, as stated, it is assumed that the liquids to be contacted are caustic and oil. Caustic being introduced to the top of the tower and being of a greater density than oil, tends to flow downwardly through the tower countercurrent to the flow of oil introduced at the bottom of the tower. A layer, or head of caustic will build up on the horizontal portions of each of the individual plates, for example, on the portions of plates 4 and 5 indicated by numerals 15 and 20, and in the trough 16 of the even-numbered plates and the step-down portions 21 and 22 of the odd-numbered plates. Similarly a layer or head of oil will build up beneath the horizontal portion of each of the plates as for example below the portions of plates 4 and 5 indicated by numerals 15 and 20. In this manner sufficient pressure will be provided so that the caustic and oil will be jetted through the perforations countercurrently to each other. Thus caustic will be jetted downwardly through the perforations 19 of trough 16 of plate 4 while oil will be jetted upwardly through the perforations of 25 of the horizontal portion of plate 5. The countercurrently moving caustic and oil will be intimately mixed in the comparatively confined spaces in the two zones formed by these perforated sections and baffle 28. The mixed oil and caustic in the form of an unstable emulsion will then flow outwardly toward the periphery of the tower into the enlarged settling zones provided. Due to the enlargement of the peripheral zone on this plate of the tower, the flow of the liquids in this portion of the tower will be comparatively slow. Furthermore, both the caustic and the oil will be flowing the same general direction; that is, in two streams toward the opposite sides of the tower away from the central mixing zone. Consequently, the caustic and oil are enabled to efficiently separate in the peripheral part of the tower. Oil will tend to separate and to collect on the under-side of section 15 of plate 4, while caustic will tend to separate and collect on the upper-side of section 20 of plate 5. Separated oil will then collect beneath the perforations 23 and pass upwardly through these perforations. Similarly caustic will overflow into stepdown-portions 21 and 22 and flow downwardly to and through the perforations 26 and 27.

The caustic jetted downwardly through perforations 26 and 27 and the oil jetted upwardly through perforations 23 and 24 on the even-numbered plates, for example plate 6, are intimately mixed in the confined zones between these perforated sections and the emulsion formed flows toward the center of the tower into the enlarged settling zone provided therein. Again the caustic and oil are enabled to efficiently separate, this time in the central portion of the tower. Oil will tend to separate and collect under section 20 of plate 5 and caustic will separate and collect on the upper side of section 15 of plate 6. Separated oil will flow upwardly through perforations 25 and on both sides of baffle 28 while separated caustic will flow into trough 16 and down through perforations 19.

From the above description it is evident that there are two paths of flow throughout the tower in both of which the oil and caustic are in countercurrent contact. Thus, on the even-numbered plates the flow is toward the center and on the odd-numbered plates, away from the center. By this means the velocity on each plate is one-half what it would be if there were only one channel of flow. Accordingly, the rate of flow is kept below that above which no separation can be obtained in the settling zones. Remixing is thus avoided and easy and complete settling and separation of the phases are obtained without danger of entrainment.

Referring now to Figure 3, a further embodiment of this invention is illustrated as applied to an extraction tower utilizing a somewhat different type of plate. In the extraction tower of Figure 3, the plates employed may be said to be an inverted arrangement of the plates illustrated in Figure 1. While not a part of this invention, it may be noted that the apparatus of Figure 1 is particularly adapted to an extraction tower in which the heavy phase is maintained as the continuous phase throughout the tower, while the apparatus illustrated in Figure 3 is particularly adapted for use in an extraction tower wherein the light phase is maintained substantially continuous throughout the tower. As shown in Figure 3, the perforated plates employed, identified by the numerals 34, 35, 36, 37, 38, 39, 40 and 41 comprise two types of plates, one set being indicated by the even numbers 34, 36, 38, 40 and the other set by the odd numbers 35, 37, 39, 41. The even-numbered plates are composed of perforated horizontal portions 42 and 43 surrounding a central trough-like section 44, extending downward from the horizontal portions 42 and 43. The trough 44 is defined by vertical walls 45 and 46 and horizontal portion 47 having centrally disposed perforations 48.

The odd-numbered plates, i. e. plates 35, 37, 39 and 41 are composed of flat portions 49 and 50 having peripheral perforations 51 and 52 respectively and placed just below the peripherally perforated portions of the even-numbered plates. A centrally disposed raised portion 53 defined by vertical walls 54 and 55 and a horizontal perforated portion 56 just below the centrally disposed perforations 48 of the even-numbered plate above. A solid baffle 57 extends from the center of perforated section 48 of the even-numbered plates to the center of the perforated portion 56 of the raised section 53 of the odd-numbered plates. A baffle 58 also extends downwardly from a point in the center of the up-raised portion of the odd-numbered plates in the same horizontal plane with the rest of the plate to a point just above the central perforated portion of the trough in the even-numbered plates.

It will be seen that the perforated portion at the top of the raised portion of the odd-numbered plates is closely adjacent the central perforated section of the trough 44 of the even-numbered plates. By this means a comparatively small confined zone is provided between successive plates. By means of baffles 57 each of these confined zones are divided into two separate zones. Also baffle 58 divides the large zone of troughs 44 into two such zones. Thus this construction provides two confined peripherally disposed mixing zones and two centrally disposed separating zones on each even-numbered plate and two centrally disposed mixing zones and two peripherally disposed settling zones on each odd-numbered plate.

Similarly to the apparatus of Figure 1, heavy phase will pass downwardly through perforations 51 and 52 and light phase upwardly through perforations 42 and 43. Similarly heavy phase will pass downwardly through perforations 48 and light phase through perforations 56. In each case the heavy and light phases will be thoroughly mixed in the confined space between the perforated plates and will pass concurrently into the adjacent settling zones. This will be toward the center on the even-numbered plates and away from the center toward the periphery on the odd-numbered plates. Baffle 57 between the perforations 48 and 56 causes the mixing to occur in separate zones and as pointed out in connection with Figure 1 cuts down on the velocity across the plate preventing remixing.

As described, therefore, the apparatus illustrated functions by maintaining a countercurrent jetting of the liquids in two confined portions of adjacent plates followed by concurrent flow of the liquid in two enlarged setting zones followed by an overflow of the separated liquids into successive mixing zones of further plates.

It is apparent that by adjusting the perforations of the mixing zone and by changing the positioning of the adjacent portions of the plates providing the mixing zones, the degree of mixing attained may be adjusted to provide any desired degree of mixing. It is further apparent that by adjusting the vertical separation of successive plates, it is possible to enlarge, or decrease the settling zones provided so as to attain the desired degree of settling for a particular liquid system. It is, therefore to be understood that the invention is not limited to any particular dimensions, or relations of step size. Furthermore, the invention is not limited to the use of dispersion holes in the plates for mixing the phases. For example, the mixing and/or settling portion of each plate may be entirely open and closely placed baffles may be placed in those openings to effect the mixing. Other suitable mixing devices may also be used as desired.

The diameter of the plates and the number of plates employed may be chosen at will depending upon the volume and extent of the treat required.

The nature and objects of the present invention having been thus set forth and specific examples of the same given, what is claimed as new and useful and desired to be secured by Letters Patent is:

1. An extraction apparatus comprising a shell having inlet and outlet conduits, a first set of vertically spaced trays mounted transversely in the shell, each tray comprising in combination a first horizontal perforated plate, a second horizontal perforated plate spaced from and on the same level as the first plate, a third horizontal perforated plate disposed below and between said first and said second plates, a pair of spaced vertical plates connecting said first and second horizontal plates with said third horizontal plate, a second set of vertically spaced trays alternately disposed with respect to said first set of trays, each of said second set of trays comprising in combination a fourth horizontal perforated plate, a fifth horizontal perforated plate spaced from and on the same level as the fourth plate, a sixth horizontal perforated plate disposed above and between said fourth and fifth plates, a pair of spaced vertical plates connecting said fourth and fifth horizontal plates with said sixth horizontal plate and a vertical baffle connecting the underside of the third horizontal plate of the first set of trays with the sixth horizontal plate of the second set of trays.

2. Apparatus according to claim 1 in which the first and second horizontal plates are spaced further apart than the fourth and fifth horizontal plates.

3. Apparatus according to claim 1 in which the first and second horizontal plates are spaced closer together than the fourth and fifth horizontal plates.

4. An extraction apparatus comprising a shell having inlet and outlet conduits, a first set of vertically spaced trays mounted transversely in the shell, each tray comprising in combination a first horizontal perforated plate, a second horizontal perforated plate spaced from and on the same level as the first plate, a third horizontal perforated plate disposed below and between said first and said second plates, a pair of spaced vertical plates connecting said first and second horizontal plates with said third horizontal plate, a second set of vertically spaced trays alternately disposed with respect to said first set of trays, each of said second set of trays comprising in combination a fourth horizontal perforated plate, a fifth horizontal perforated plate spaced from and on the same level as the fourth plate, a sixth horizontal perforated plate disposed above and between said fourth and fifth plates, a pair of spaced vertical plates connecting said fourth and fifth horizontal plates with said sixth plate, a vertical baffle connecting the underside of the third horizontal plate of the first set of trays with the top side of the sixth horizontal plate of the second set of trays and a vertical baffle between and spaced from the underside of the sixth horizontal plate of the second series of trays and the top side of the third horizontal plate of the first series of trays.

5. An extraction apparatus comprising a shell having inlet and outlet conduits, a first set of vertically spaced trays mounted transversely in the shell, each tray comprising in combination a first horizontal perforated plate, a second horizontal perforated plate spaced from and on the same level as the first plate, a third horizontal perforated plate disposed below and between said first and said second plates, a pair of spaced vertical plates connecting said first and second plates with said third plate, a second set of vertically spaced trays alternately disposed with respect to said first set of trays, each of said second set of trays comprising in combination a fourth horizontal perforated plate, a fifth horizontal perforated plate spaced from and on the same level as the fourth plate, a sixth horizontal perforated plate disposed above and between said fourth and fifth plates, a pair of spaced vertical plates connecting said fourth and fifth plates with said sixth plate, and a vertical baffle between and spaced from the underside of the sixth horizontal plate of the second series of trays and the top side of the third horizontal plate of the first series of trays.

ROBERT S. WOOD.

References Cited in the file of this patent

UNITED STATES PATENTS

| Number | Name | Date |
|---|---|---|
| 1,684,489 | Holloran | Sept. 18, 1928 |
| 1,744,134 | Morrell | Jan. 21, 1930 |
| 2,048,820 | Schmidt | July 28, 1936 |
| 2,082,034 | Smith | June 1, 1937 |
| 2,250,976 | Van Dijck | July 29, 1941 |
| 2,266,521 | Van Dijck | Dec. 16, 1941 |
| 2,271,462 | Pfennig | Jan. 27, 1942 |
| 2,405,158 | Mensing | Aug. 6, 1946 |
| 2,460,019 | Long et al. | Jan. 25, 1949 |
| 2,528,426 | Davis et al. | Oct. 31, 1950 |

FOREIGN PATENTS

| Number | Country | Date |
|---|---|---|
| 685,734 | France | July 16, 1930 |